March 29, 1960 M. H. EMRICK 2,930,261
HIGH POWERED SPINDLE OPERATING UNIT FOR
DRILLING AND TAPPING MACHINES
Filed Oct. 23, 1957 2 Sheets-Sheet 1
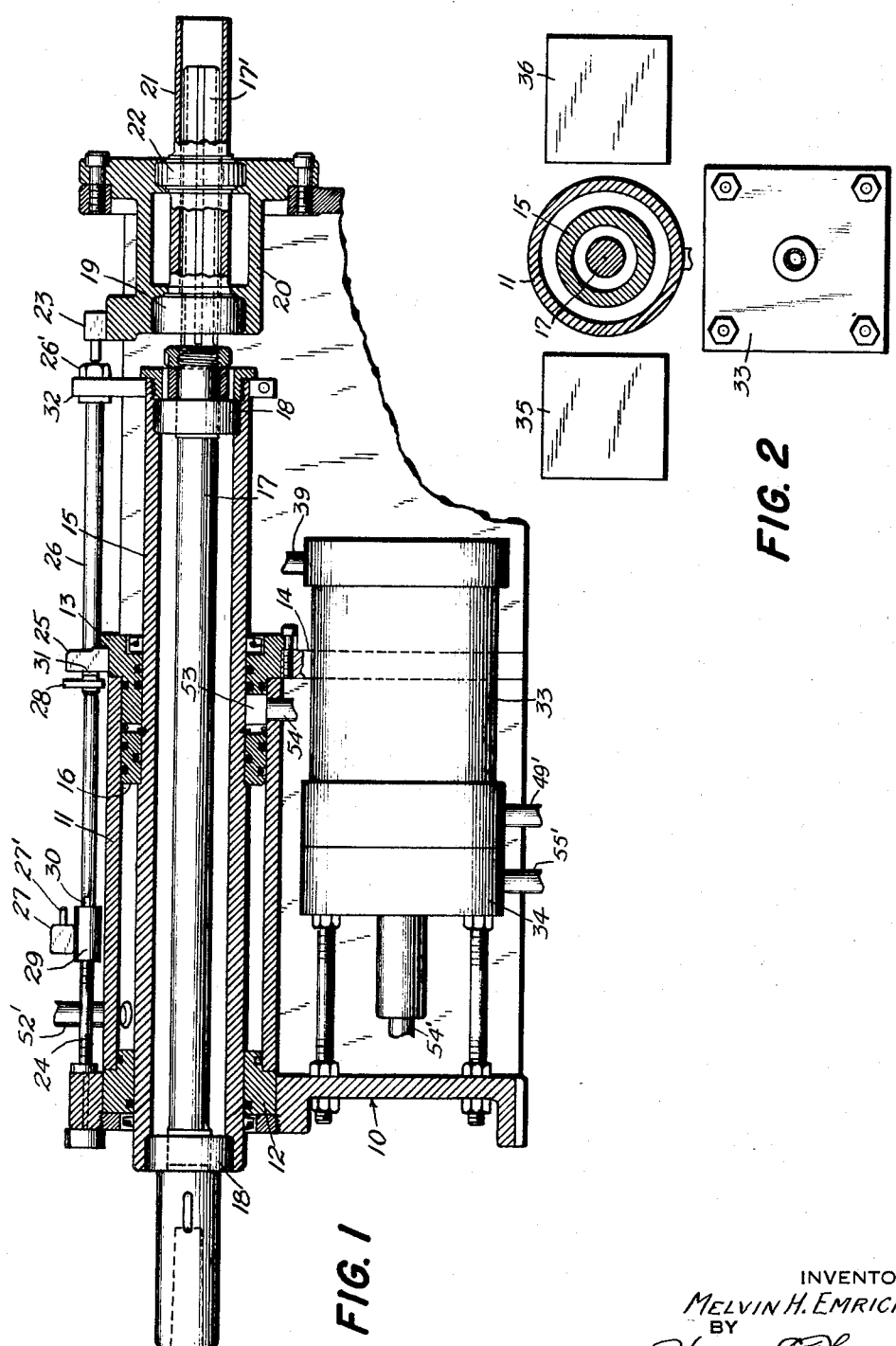
INVENTOR
MELVIN H. EMRICK
BY
ATTORNEY March 29, 1960

M. H. EMRICK 2,930,261

HIGH POWERED SPINDLE OPERATING UNIT FOR
DRILLING AND TAPPING MACHINES

Filed Oct. 23, 1957

INVENTOR
MELVIN H. EMRICK
BY
Howard Thompson
ATTORNEY

2,930,261

HIGH POWERED SPINDLE OPERATING UNIT FOR DRILLING AND TAPPING MACHINES

Melvin H. Emrick, Manhasset, N.Y.; Dorothea A. Emrick, executrix of the estate of said Melvin H. Emrick Application October 23, 1957, Serial No. 691,960

7 Claims. (Cl. 77—33.5)

This invention relates to drilling and tapping machines employing a tool operated spindle, with which drilling or tapping tools are adapted to be coupled. More particularly, the invention deals with a spindle actuating unit for controlling movement and feed of the spindle.

Still more particularly, the invention deals with a unit of this type and kind employing a high powered hydraulic factor for actuating the spindle timely with the feed of the tool, coupled with the spindle, through the workpiece, means being provided to automatically control the depth of the high powered feed motion of the spindle and the tool coupled therewith.

The novel features of the invention will be best understood from the following description, when taken together with the accompanying drawing, in which the separate parts are designated by suitable reference characters in each of the views and in which:

Fig. 1 is a longitudinal sectional view through a unit made according to my invention, showing part of the control mechanism of the unit, with parts of the construction broken away.

Fig. 2 is a diagrammatic sectional view through part of the unit shown in Fig. 1, primarily to illustrate the general arrangement of the hydraulic reservoirs with respect to the fluid booster.

Figure 3:
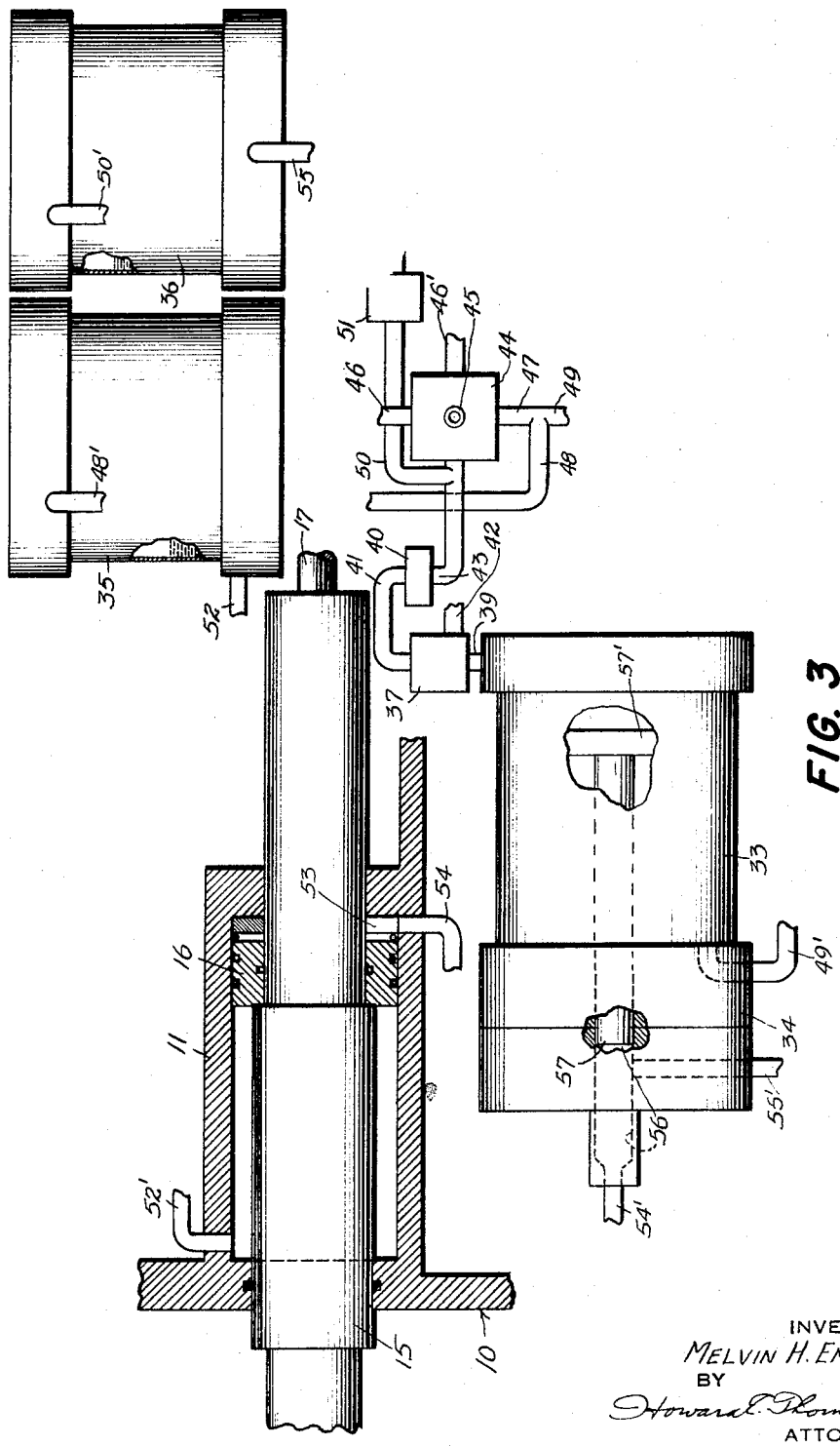
Fig. 3 is an enlarged diagrammatic showing of part of the unit shown in detail in Fig. 1 and showing the various valve mechanism and piping to the respective reservoirs and booster employed.

In Fig. 1 of the drawing, I have shown at 10 the casing of my improved unit, which is adapted for horizontal and/or vertical mounting in connection with a drilling or tapping machine of any type or kind, the casing having a hydraulic cylinder 11 mounted and sealed in bearings 12 and 13, the bearing 13 having a support in the frame 10, as indicated at 14.

Slidably mounted in the bearings 12 and 13 is a spindle guiding and operating tubular piston rod 15, with which is coupled a piston 16 which operates in the cylinder 11.

At 17 I have shown a tool operating spindle rotatably mounted in bearings 18 at the ends of the tubular rod 15 and fixed by said bearings 18 against longitudinal axial movement with respect to the tube 15.

The spindle 17 has an extended coupling end 17' for coupling with suitable driving means, not shown, the end 17' having a bearing support, as at 19, in a bearing casing 20 secured to the frame 10 and at 21 is shown a coupling sleeve encircling the end 17' and having a bearing support in the casing 20, as at 22. Mounted on the casing 20 is a micro-switch 23, the function of which will be later described.

Adjustably supported on a rod 24, having suitable supports in bearings 12 and 13 at one side of a support 25 for a switch operating rod 26, is a micro-switch 27, the switch element 27' of which is offset to be in the path of an operating finger part 28 on one end of the rod 26. The support 29 for the switch 27 includes a projecting stop pin 30 which operates in conjunction with an offset 31 on the part 28 in finally checking the forward feed motion of the tool spindle.

It will appear that the rod 26 has a support 32 on the tubular piston rod 15 so that, as the piston is advanced in the cylinder 11, the finger 28 will be moved into engagement with the micro-switch 27 which is the depth control switch automatically stopping the forward feed motion of the spindle 17 and reversing the drive of the spindle to retract the tool from the workpiece in operation of the unit, as later described.

At the end of the reverse movement of the spindle, the end of the rod 26 or a nut 26' mounted thereon will actuate the micro-switch 23. When this switch is actuated, it can control a second operation, such as actuating an indexing table on the machine to bring successive workpieces into position to register with a tool on the spindle 17 in preparing the machine for a next successive operation which can be under manual control or, in some instances, could be in an automatic operation. No attempt is shown to illustrate such an indexing table, as this would form no part of the present conception.

Mounted within the casing 10 is a hydraulic booster cylinder 33, having a discharge end 34 and also disposed within the casing at sides of and above the cylinder 33 are two reservoirs 35 and 36, as will appear from the diagrammatic showing of Fig. 2, which simply illustrates an arrangement of 33, 35 and 36 with respect to a hydraulic cylinder 11, the rest of the showing of Fig. 1 of the drawing being omitted.

In Fig. 3 of the drawing, I have diagrammatically illustrated the hydraulic system, including the valves controlling the charge of the hydraulic medium to the hydraulic cylinder 11 in initial operation of the spindle 17 and for the booster operation thereof in feed of the tool coupled with said spindle through the workpiece.

In the diagrammatic showing of Fig. 3, 37 represents diagrammatically a three-way air valve which, when the unit is at rest, is normally closed, this valve being supported directly upon one end of the cylinder 33 and having a pipe connection with said end of the cylinder, as indicated at 39.

Arranged adjacent the valve 37 is a speed control valve 40 having a pipe connection, as at 41, with the valve 37. The valve 37 also includes an exhaust pipe 42 and extending from the valve 40 is a pipe 43 which extends to a four-way solenoid actuated air valve 44. The valve 44 has a connection 45, with which a source of air supply, under pressure, can be directed to the valve 44. Also coupled with the valve 44 are two exhausts 46, 46' and a pipe 47. The pipe 47 includes extensions 48 and 49. The extension 48 is directed to the upper portion of the reservoir 35, as seen at 48'; whereas, the pipe 49 is directed to and communicates with one end portion of the cylinder 33, as seen at 49'.

Communicating with the pipe 43, adjacent the valve 44, is a pipe 50 having a speed control valve 51 therein, the pipe being directed to and communicating with the upper portion of the reservoir 36, as indicated at 50'.

At the lower end of the reservoir 35 is a pipe 52 which communicates with one end of the hydraulic cylinder 11, as seen at 52'. Communicating with a chamber 53, at the other end of the cylinder 11, is another pipe 54, the latter pipe having a connection with the end 34 of the cylinder 33, as at 54'. At the lower end of the reservoir 36 is a discharge pipe 55 which communicates with the discharge end 34 of the fluid booster, as seen at 55', and this communication is with a small diameter discharge cylinder 56 in the booster, in which a piston 57 is mounted, the piston 57 normally assuming the position indicated in Fig. 3 with the pipe communication 55' exposed to the cylinder 56.

The piston 57 has a large diameter piston end 57' which operates in the large diameter portion of the booster cylinder 33, as seen, in part, in Fig. 3 of the drawing.

The position of the parts, diagrammatically illustrated in Fig. 3 of the drawing, may be said to illustrate the apparatus at rest. Now, in setting the apparatus in motion by a manually controlled switch, not shown, the solenoid valve 44 is put into operation to direct air, under pressure, to the upper end of reservoir 36 passing through the speed control valve 51 to control movement transmitted to the spindle 17.

The introduction of air into the reservoir 36 will cause the hydraulic medium to be injected into the small diameter cylinder 56 through pipes 55, 55' and, thus, through pipes 54', 54 into the chamber 53 to advance the piston 16. In this operation, the hydraulic medium in the cylinder 11 forwardly of the piston will be returned to reservoir 35 through pipes 52', 52 and air, at the top of the reservoir 35, is exhausted through pipe 48', 48 and one of the exhausts, for example, the exhaust 46' of the valve 44.

The foregoing operations continue until the tool carried by the spindle is brought into engagement with a workpiece; whereupon, the air, under pressure in the pipe 43, is built-up to a degree sufficient to pass through the speed control valve 40 and, thus, through the valve 37 into one end portion of the booster cylinder 33 to actuate the large diameter piston 57'. It will be understood, in this connection, that the admission of oil under pressure into the cylinder 56, as previously described, is not sufficient to advance the tool into the workpiece.

The operation of the piston 57' continues until the piston 77 closes the pipe 55'; whereupon, the hydraulic medium in the cylinder 56 is then under high pressure being directly operated by the piston 57', 57, thus advancing the piston 16 in movement of the tool into the workpiece. In this last named operation, the speed control valve 40 controls the speed of movement of the spindle or the tool coupled therewith into the workpiece and this operation continues until the switch 27' is actuated by the finger part 28 which stops the forward progress of the tool and this operation automatically actuates the four-way solenoid valve to return it to rest position.

In the above described booster operation of the spindle and the tool coupled therewith, air in the booster cylinder 33 at the forward end of the piston 57' is exhausted through the exhaust 46' through pipes 49', 49 and, at the same time, air from the upper end of the reservoir 35 is exhausted through pipes 48', 48.

Upon actuation of the four-way valve 44, as above noted, in completion of the booster stroke, air, under pressure, is then directed to the upper end of the reservoir 35 through pipes 48, 48'. In this operation, the hydraulic medium in the reservoir 35 is forced into the cylinder 11 through pipes 52, 52' to return the piston 16 to its normal rest position. During this operation, air, under pressure, is also directed to the forward end of the booster cylinder 33 through pipes 49, 49' to also return the pistons 57, 57' to the position diagrammatically shown in Fig. 3. At the completion of this operation, the micro-switch 23 is actuated to perform the function of actuating an indexing table, as previously noted.

During the above described return actuation of the pistons 16, 57, 57', the hydraulic medium in the cylinder 11 is returned through the system and ultimately back to the reservoir 36 through pipes 54, 54'; 55', 55 and the air, at the top of the reservoir 36, exhausted through the exhaust 46 of the valve 44 and, at the same time, air in back of the piston 57' is exhausted through the exhaust pipe 42 of the valve 37 and air which may prevail in the pipe 43 is exhausted through the exhaust 46 of the valve 44.

The apparatus is now at the rest or momentary rest position for further manual operation or for automatic repeat operation as and when automatic controls are deemed to be desirable.

With my improved unit, the same can be operated at high pressures, for example, twenty-five hundred pounds to a square inch and this can be maintained without any appreciable rise in temperature. By reason of this temperature control, no expansion takes place which would result in upsetting the hydraulic seal or the functioning of the bearings employed. This system of operation also maintains the viscosity of the hydraulic medium employed which results in a uniform control of the spindle operation.

It will be understood that the illustrations in Figs. 2 and 3 of the drawing are entirely diagrammatic as to the showing of the several parts and their relationship one with respect to the other, the showing of Fig. 2 being simply to designate a relationship of the parts 33, 35 and 36 with respect to the cylinder 11; whereas, Fig. 3 is simply to illustrate a diagrammatic showing of the hydraulic system without any accurate reference to the structure of the unit or, in fact, any of the parts illustrated.

Having fully described my invention, what I claim as new and desire to secure by Letters Patent is:

1. A hydraulic booster tool operating unit of the character described, comprising a casing, a hydraulic cylinder supported in sealed bearings arranged in the casing, an elongated tubular piston rod slidably mounted in said bearings, a piston on said rod operating in said cylinder, means at end portions of the cylinder for admitting a hydraulic medium in operation of the piston in both directions in said cylinder, a tool supporting and operating spindle having bearing mountings in said tubular piston rod and coupled with the rod for movement therewith, a hydraulic system comprising a booster cylinder mounted in said casing below said hydraulic cylinder and having large and small diameter pistons and two reservoirs arranged at opposed sides of said cylinder and storing the hydraulic medium, a solenoid actuated four-way air valve for controlling transmission of air under pressure into one of said reservoirs for actuating the hydraulic medium in controlling initial movement of the tool spindle from an inoperative position to engagement of the tool with a workpiece in a low pressure operation of said spindle, means to then introduce air under pressure directly into one end of the booster cylinder to actuate said large diameter piston in a high pressure operation of the hydraulic medium by said small diameter piston in movement of the spindle in feed of the tool supported thereby into the workpiece, means to actuate a depth control switch at the limit of movement of the tool into a workpiece to return the solenoid valve to rest position, whereupon air, under pressure, is introduced into the other of said reservoirs for actuating the hydraulic medium in the return stroke of the piston in said hydraulic cylinder and into the booster cylinder in return of the pistons thereof to normal position, and another switch actuated upon limit of the return stroke motion of the piston in said hydraulic cylinder in controlling a predetermined cycle of operation.

2. A structure as defined in claim 1, wherein the hydraulic system includes a three-way valve coupled with the booster cylinder controlling introduction of air under pressure into one end of said booster cylinder and exhaust of air therefrom.

3. A hydraulic tool operating unit of the character described, comprising a tool supporting spindle, a hydraulic system for actuating said spindle comprising low pressure means for operating the spindle in moving the tool to a point of engagement with a workpiece to be formed, means to then hydraulically actuate the spindle under high pressure in movement of the tool of the spindle into the workpiece a predetermined depth controlled by a switch, actuation of said switch operating the hydraulic system to transmit a hydraulic medium for reverse movement of the spindle and relieve the hydraulic medium utilized in the initial advance movement of the spindle, actuating a switch at the end of said reverse movement of the spindle in setting the hydraulic system momentarily at rest, said hydraulic system including a four-way solenoid air valve controlling transmission of air directly into a pair of reservoirs containing a hydraulic medium, and a three-way valve on a booster cylinder controlling transmission of air from said four-way valve to the booster cylinder in the high pressure operation of said spindle.

4. A hydraulic booster tool operating unit of the character described, comprising a casing, a hydraulic cylinder supported in sealed bearings arranged in the casing, an elongated tubular piston rod slidably mounted in said bearings, a piston on said rod operating in said cylinder, means at end portions of the cylinder for admitting a hydraulic medium in operation of the piston in both directions in said cylinder, a tool supporting and operating spindle having bearing mountings in said tubular piston rod and coupled with the rod for movement therewith, a hydraulic system comprising a booster cylinder mounted in said casing below said hydraulic cylinder and having large and small diameter pistons and two reservoirs arranged at opposed sides of said cylinder and storing the hydraulic medium, a solenoid actuated four-way air valve for controlling transmission of air under pressure into one of said reservoirs for actuating the hydraulic medium in controlling initial movement of the tool spindle from an inoperative position to engagement of the tool with a workpiece in a low pressure operation of said spindle, means to then introduce air under pressure directly into one end of the booster cylinder to actuate said large diameter piston in a high pressure operation of the hydraulic medium by said small diameter piston in movement of the spindle in feed of the tool supported thereby into the workpiece, means to actuate a depth control switch at the limit of movement of the tool into a workpiece to return the solenoid valve to rest position, whereupon air, under pressure, is introduced into the other of said reservoirs for actuating the hydraulic medium in the return stroke of the piston in said hydraulic cylinder and into the booster cylinder in return of the pistons thereof to normal position, another switch actuated upon limit of the return stroke motion of the piston in said hydraulic cylinder in controlling a predetermined cycle of operation, the hydraulic system including a three-way valve coupled with the booster cylinder and controlling introduction of air under pressure into one end of said booster cylinder and exhaust of air therefrom, and a speed control valve exposed to the air line leading to said three-way valve.

5. A structure as defined in claim 4, wherein a speed control valve is in the air line leading from the four-way solenoid valve to the upper portion of the first named reservoir.

6. A hydraulic booster tool operating unit of the character described, comprising a casing, a hydraulic cylinder supported in sealed bearings arranged in the casing, an elongated tubular piston rod slidably mounted in said bearings, a piston on said rod operating in said cylinder, means at end portions of the cylinder for admitting a hydraulic medium in operation of the piston in both directions in said cylinder, a tool supporting and operating spindle having bearing mountings in said tubular piston rod and coupled with the rod for movement therewith, a hydraulic system comprising a booster cylinder mounted in said casing below said hydraulic cylinder and having large and small diameter pistons and two reservoirs arranged at opposed sides of said cylinder and storing the hydraulic medium, a solenoid actuated four-way air valve for controlling transmission of air under pressure into one of said reservoirs for actuating the hydraulic medium in controlling initial movement of the tool spindle from an inoperative position to engagement of the tool with a workpiece in a low pressure operation of said spindle, means to then introduce air under pressure directly into one end of the booster cylinder to actuate said large diameter piston in a high pressure operation of the hydraulic medium by said small diameter piston in movement of the spindle in feed of the tool supported thereby into the workpiece, means to actuate a depth control switch at the limit of movement of the tool into a workpiece to return the solenoid valve to rest position, whereupon air, under pressure, is introduced into the other of said reservoirs for actuating the hydraulic medium in the return stroke of the piston in said hydraulic cylinder and into the booster cylinder in return of the pistons thereof to normal position, another switch actuated upon limit of the return stroke motion of the piston in said hydraulic cylinder in controlling a predetermined cycle of operation, said booster cylinder comprising a large diameter booster cylinder portion, a small diameter cylinder discharging from the booster cylinder, in which a piston is movable, the diameter of the booster cylinder portion being materially greater than twice the diameter of the small diameter cylinder, and the hydraulic medium from the first named reservoir entering the small diameter cylinder forwardly of the end of the piston arranged therein in the initial operation of the piston in the first named hydraulic cylinder in movement of the tool of the spindle to engagement with the workpiece.

7. A structure as defined in claim 6, wherein the piston in said small diameter cylinder is actuated by a large diameter piston in the booster cylinder portion to first close communication of the small diameter cylinder with said first named reservoir, and then to transmit the high pressure charge of the medium to the hydraulic cylinder in movement of the tool of said spindle into the workpiece.

References Cited in the file of this patent

UNITED STATES PATENTS

| | | |
|---|---|---|
| 2,013,420 | Opel | Sept. 3, 1935 |
| 2,740,258 | Weber | Apr. 3, 1956 |